3,357,332
PHOTOGRAPHIC CAMERA RELEASE AND TIME EXPOSURE DEVICE

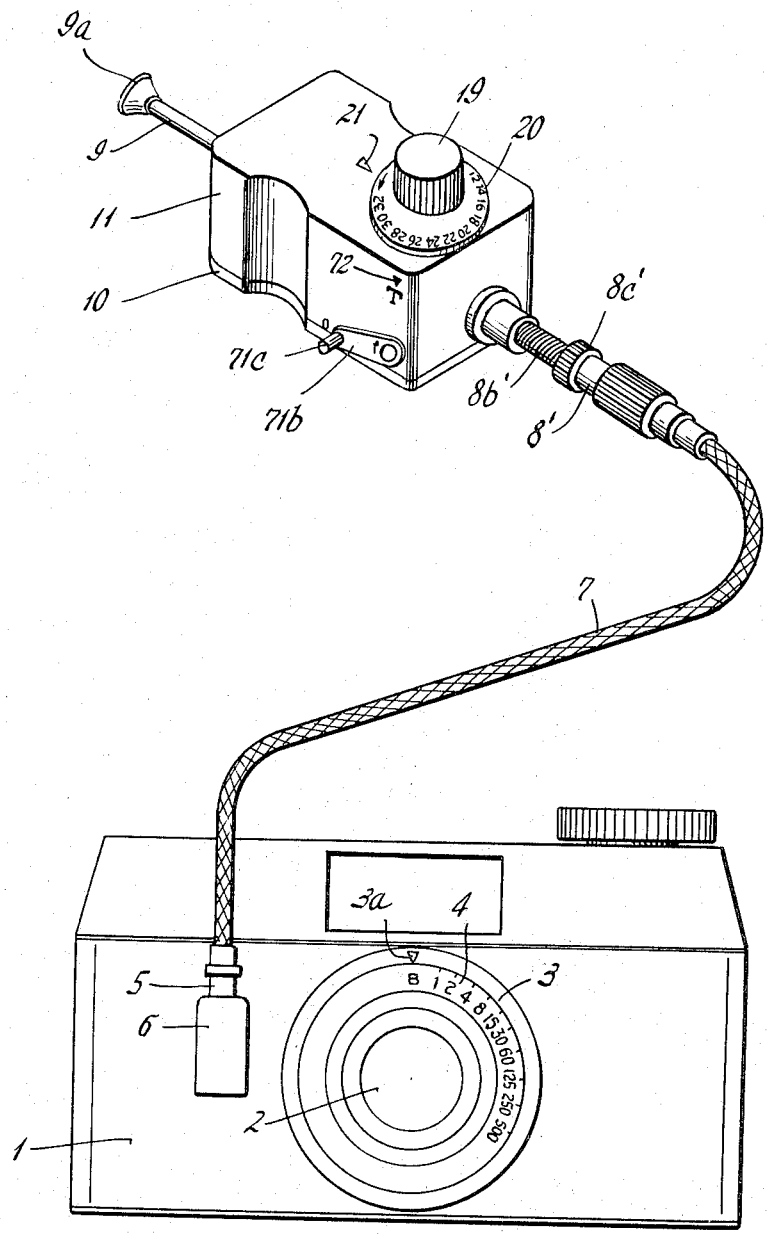

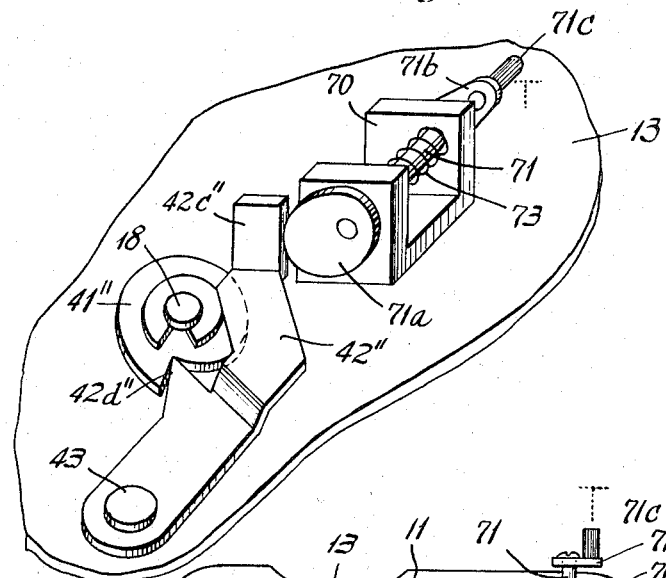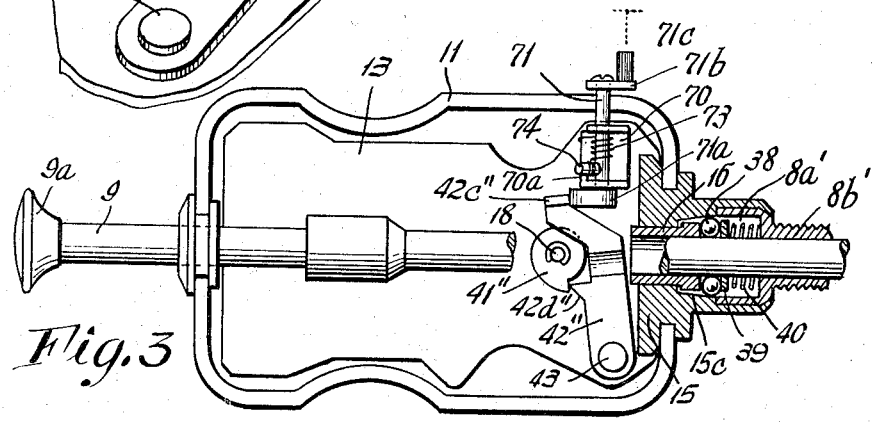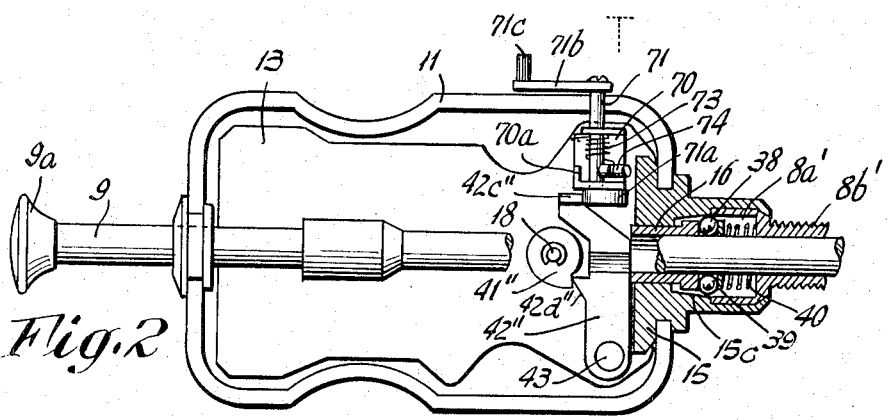

Karl Helber, Calmbach, Black Forest, and Rolf Reinhold Bott, Hofen (Enz), Germany, assignors to Prontor-Werk Alfred Gauthier G.m.b.H., Calmbach (Enz), Germany, a corporation of Germany
Filed May 28, 1965, Ser. No. 459,805
Claims priority, application Germany, May 30, 1964, G 40,726
4 Claims. (Cl. 95—53)

ABSTRACT OF THE DISCLOSURE

A device for operating a photographic camera by means of a push rod which acts on the shutter of the camera in order to obtain comparatively long exposure times when the camera is set to its "B" setting. The device is provided with a spring driven, manually cockable mechanism which can be preset for different running times. A lock is engageable with the push rod to hold the push rod in a released position. An actuating device is provided which is connected to the push rod for actuation thereby when the push rod is moved to its release position. The actuating device comprises a driving spring, a driven member and a setting control. The driven member is engageable with the lock to release the same thereby to permit the push rod to return to an extended position. A fixing device is also provided which comprises means engageable with the driven member to prevent the driven member from releasing the lock when the fixing device is set for ultra-long exposures.

---

This invention relates to a device for operating a photographic camera by means of a push-rod which acts on the shutter of the camera and which, in order to obtain comparatively long exposure times when the camera is set to its "B" setting, is also provided with a spring-driven, manually cockable mechanism which can be preset for different running times.

The co-pending application of Waldemar T. Rentschler, Ser. No. 350,414, now Patent No. 3,276,342, describes a device which, upon manual actuation of a push-rod designed to actuate a camera shutter, releases a previously cocked mechanism so that it can run down. At the same time, a locking arrangement blocks the push-rod in the release position until an actuating device, which becomes operative at the end of the running-down motion of the mechanism, permits the push-rod to return to the starting position. During this operation, the mechanism that has been released and is running down controls the actuating device which, in turn, releases the push-rod retained in the release position by the locking device and which thereby automatically terminates the exposure previously initiated by manual operation.

The present invention is a marked improvement of the subject matter of the Rentschler application, supra. It is a primary object of the present invention to improve the aforesaid device, while maintaining the advantages resulting thereof, so that it is possible to make exposures of any duration desired.

Broadly the apparatus to carry out the foregoing object includes a manually operable fixing device associated with the actuating device that co-operates with the locking device. The fixing device, which permits exposures of any length desired, can be moved into a setting position in which the actuating device no longer controls the locking device until the fixing device is returned to the starting position. This establishes a preliminary condition. The same device makes it possible to carry out exposures of any duration desired in addition to the presettable exposure times controlled by the shutter mechanism. In order to be sure that the fixing device operates dependably and that only simple structural elements are required, the present invention provides that the fixing device co-operates directly with a pressure lever of the actuating device, the pressure lever being associated with a ball ratchet.

Another feature of the invention resides in the fact that the fixing device comprises an adjusting shaft which is positioned in a frame and one end of which carries an eccentric co-operating with the pressure lever, while the other end carries a manually operable change, or adjusting lever. A preferred development of the invention includes a restoring spring associated with the adjusting shaft to exert pressure to return the fixing device from its operative setting position to the inoperative starting position. This facilitates the handling of the device for the photographer and prevents faulty settings.

An embodiment of the invention will be described below with reference to the accompanying drawing, in which:

FIG. 1 shows a perspective overall view of the device provided with a fixing device for carrying out "T" exposures, in conjunction with a photographic camera;

FIG. 2 is a view of the interior of the device with the upper portion of the housing removed; the mechanism being omitted and the fixing device being in inoperative setting position;

FIG. 3 shows the same arrangement with the fixing device set for carrying out "T" exposures; and FIG. 4 is a perspective view, on an enlarged scale, of the fixing device moved into "T" position and the pressure lever co-operating therewith.

As in the Rentschler application, supra, a photographic camera 1 is provided with an intra-lens shutter 2, having an exposure setting ring, or shutter speed control 3 that can be set, by means of the mark 3a, with respect to a fixed scale 4 which comprises, in addition to instantaneous exposure times of the order of magnitude from 1 sec. to 1/500 sec., a "B" position. If the shutter speed control 3 is set at "B," as illustrated in FIG. 1, exposure times of unlimited duration can be obtained with the aid of a "B" device provided as part of the shutter mechanism. This device may include, primarily, an arresting lever that co-operates with the driving mechanism of the shutter so that, after the shutter release has been actuated, the arresting lever holds the shutter blades in their open position until the release member is relieved from pressure.

In many cases, "B" exposures are carried out with the aid of a cable or wire release, which can usually be connected to a connecting member 6 of the camera 1 or of the shutter 2 by means of a threaded nipple 5 arranged at one end of the cable release. The nipple 5 of the release member is rotatably connected to a cable 7 within which is a pressure spiral. The other end of the cable is fixed in a sleeve 8' provided with an internal thread. In order to adapt the cable release to different pressure strokes of the shutter release of the different shutter types, the sleeve can be screwed on to a threaded socket 8b' to any desired extent within its limits. The socket 8b' is fixedly arranged on a housing 10, 11 of the device for ultra-long exposure times. Moreover, the sleeve 8' can be secured against unintentional rotary motions by means of a lock-nut 8c'. In addition, the threaded socket 8b' guides an axially displaceable push-rod 9, which acts on the pressure spiral and which is provided with a button 9a serving as finger support.

As also illustrated in FIG. 1, the housing 10, 11 is preferably shaped to be easily gripped by the photographer's fingers and consists substantially of the two cups 10 and 11. These cups are releasably connected to each other in a suitable manner, not shown in the drawing for the sake of simplicity. Arranged in the housing 10, 11 is a base plate 13, on which the mechanism for controlling the ultra-long exposure times is supported. For the sake of simplicity, the mechanism is indicated, in FIGS. 2 and 3, only by the cocking and driving shaft 18 as well as by a control cam 41″ non-rotatably mounted on this shaft. An actuating knob 19 with a scale 20 is non-rotatably arranged on the free end of the shaft 18 projecting from the upper side of the housing 10, 11, and a fixed mark 21 is associated with the scale to indicate the exposure time to which the knob 19 and scale 20 are set. Exposure times ranging from 2 to 32 sec. may be set by this mechanism.

According to the arrangement in FIG. 1, the push-rod 9 is depressed for the purpose of releasing, or actuating, the camera shutter. A ball ratchet is provided for the purpose of retaining the push-rod 9 in its depressed, or released, position. The ball ratchet may be constructed in a manner known per se in cable or wire releases and may be arranged in a hollowed-out groove 8a′ of the threaded socket 8b′ designed to guide the push-rod 9. The locking elements may be balls 38 which are inserted between the push-rod 9 of the release member and a conical inner wall 15c of a cap 15. By means of a coil spring 40 and a pressure plate 39, the balls 38 are pressed against the displaceable sleeve 16. Moreover, the arrangement of the ball ratchet is such that the balls 38 allow the push-rod 9 to be depressed but prevent its return to the starting position by wedging in the conical seat 15c of the capsule 15 until their clamping effect is abolished by pressure on the sleeve 16 which counteracts the spring 40.

According to FIG. 2 of the drawing, pressure is placed on the sleeve 16, in the basic or normal, position of the device, by a pressure lever 42″ mounted on the base plate 13 to cooperate with the control cam 41″. The cam 41″, in turn, is acted on by the driving spring of the mechanism, this driving spring tending to rotate the cam counterclockwise. A lug of the cam 41″ is thereby brought into engagement with a projection 42d″ of the pressure lever 42″ to press the lever 42″ against the sleeve 16, whereby the ball ratchet 15c, 38 to 40 becomes inoperative.

In order to be able to use the device for ultra-long exposures which have a duration exceeding the time settable by means of the button 19 and the scale 20, i.e., a duration of any length desired, the invention includes a manually operable device for fixing the pressure lever 42″. This device comprises a U-shaped frame 70, which is attached to the base plate 13 and serves to position an adjusting shaft 71. The end of the shaft 71 associated with the pressure lever 42″ is provided with a non-rotatably mounted eccentric 71a, while its other end—which projects from the housing 10, 11 as is especially apparent in FIGS. 2 and 3—has an adjusting lever 71b non-rotatably attached to it and provided with a pin 71c at its free end. The end of the pressure lever 42″ facing the eccentric 71a comprises a lug 42c″ which is bent off at a right angle and which cooperates with the eccentrric 71a. A mark 72 identified by a "T" is arranged on the outside of the housing 10, 11.

In order to carry out "T" exposures, i.e., exposures whose exposure time exceeds the maximum exposure time settable on the scale 20, the photographer must place adjusting lever 71b opposite the "T" position identified by the mark 72 in FIG. 1. This rotates the eccentric 71a and forces the pressure lever 42″ engaging said eccentric to be pivoted counterclockwise about its axis 43 so as to be lifted off the sleeve 16. Because of the tensional connection between the pressure lever 42″ and the cam 41″, the latter is moved clockwise while simultaneously cocking the driving spring of the mechanism (not shown in the drawing). The friction between the pressure lever 42″ and the eccentric 71a produced by the cocked driving spring retains said eccentric in the "T" position. Conquently, having been depressed, the release push-rod 9 remains in the release position, as long as the adjusting lever 71b is left in the "T" position by the photographer. Only after the lever 71b has again been moved into the basic or normal position identified by the letter O in FIG. 1, will the spring-loaded cam 41″ again press the lever 42 against the sleeve 16 to cause the ball ratchet 15c, 38 to 40 to be released. This permits the release push-rod 9 to reutrn to the basic or normal position, which, in turn, allows the shutter blades of the camera shutter to return to their closed position.

In order to prevent the fixing device from influencing the pressure lever 42″ or from impairing the running down of the mechanism when the exposure time is set by the button 19 and the scale 20, the invention provides for a restoring spring 73 mounted on the adjusting shaft 71. One end of this spring 73 acts on a pin or pivot 74 of the shaft 71, while the other end is suspended in the positioning or bearing frame 70. The restoring spring 73 has the effect that, whenever the photographer has preselected a specific exposure time by means of the button 19 but has also, perhaps unintentionally, actuated the fixing device, the adjusting lever 71b is automatically returned to the basic or normal position O, so that the pressure lever 42″ can be pressed against the pressure sleeve 16 by the cam 41″ after the preset exposure time has run down. On the other hand, the fixing device can be automatically returned by means of the restoring spring 73 from the "T" position of the adjusting lever 71b defined by an end stop 70a, when the tensional connection between the cam 41″ and the pressure lever 42″ is removed by clockwise rotation of the button 19 or of the cam connected thereto.

What is claimed is:

1. A device for actuating a shutter of a photographic camera, said device comprising: a push-rod connected to said shutter; a lock engageable with said push-rod to hold the latter in a release position; an actuating device connected to said push-rod to be actuated thereby when said push-rod is moved to its release position, said actuating device comprising a driving spring, a driven member, and a setting control, said driven member being engageable with said lock to release the same and thereby permit said push-rod to return to an extended position; and a fixing device comprising means engageable with said driven member to prevent said driven member from releasing said lock when said fixing device is set for ultra-long exposures.

2. A device for actuating a shutter of a photographic camera, said device comprising: a push-rod connected to said shutter; a lock engageable with said push-rod to hold the latter in a release position, said lock comprising a ball ratchet; an actuating device connected to said push-rod to be actuated thereby when said push-rod is moved to its release position, said actuating device comprising a driving spring, a pressure lever, and a setting control, said pressure lever being engageable with said ball ratchet to release the same and thereby permit said push-rod to return to an extended position; and a fixing device comprising means engageable with said pressure lever to prevent said pressure lever from releasing said lock when said fixing device is set for ultra-long exposures.

3. A device for actuating a shutter of a photographic camera, said device comprising: a push-rod connected to said shutter; a lock engageable with said push-rod to hold the latter in a release position; an actuating device connected to said push-rod to be actuated thereby when said push-rod is moved to its release position, said actuating device comprising a driving spring, a driven portion including a pressure lever, and a setting control, said pressure lever being engageable with said lock to release the same and thereby permit said push-rod to return to an extended position; and a fixing device comprising a frame, an adjusting shaft supported in said frame, a manual control lever at one end of said shaft, and an eccentric at the other end of said shaft to cooperate with said pressure lever to prevent said pressure lever from releasing said lock when said manual control lever is set to an operative position for ultra-long exposures.

4. A device for actuating a shutter of a photographic camera, said device comprising: a push-rod connected to said shutter; a lock engageable with said push-rod to hold the latter in a release position; an actuating device connected to said push-rod to be actuated thereby when said push-rod is moved to its release position, said actuating device comprising a driving spring, a driven portion including a pressure lever, and a setting control, said pressure lever being engageable with said lock to release the same and thereby permit said push-rod to return to an extended position; and a fixing device comprising a frame, an adjusting shaft supported in said frame, a manual control lever at one end of said shaft movable between an operative setting position and an inoperative starting position, an eccentric at the other end of said shaft to cooperate with said pressure lever to prevent said pressure lever from releasing said lock when said manual control lever is set to its operative position for ultra-long exposures, and a second spring connected to said shaft to urge said control lever toward its inoperative position.

References Cited
UNITED STATES PATENTS 1,175,398   3/1916   Zellers _____ 95—53.6

JOHN M. HORAN, *Primary Examiner.*